Jan. 3, 1928.

R. E. CLEGG

LOCK WASHER

Filed July 23, 1926

Inventor
Roy E. Clegg.
By Cheever & Cox
Attys.

Patented Jan. 3, 1928.

1,654,789

UNITED STATES PATENT OFFICE.

ROY E. CLEGG, OF CHICAGO, ILLINOIS.

LOCK WASHER.

Application filed July 23, 1926. Serial No. 124,319.

This invention relates to nut locks especially designed for use in conjunction with the fish plates of rail joints between railroad rails.

It has for its object the provision of a device of this character that will be automatically effective as the nut is screwed upon the bolt to prevent any retrograde movement thereof; but which will not retard or interfere with the normal operation of the nut in engaging the bolt.

Another object of the present invention is to provide a nut locking structure that will not in any way mutilate the threads on either the bolt or the nut and which can be manipulated to release the nut to allow a retrograde movement thereof for the purpose of disengaging the same from the bolt. Thus, by use of this nut lock the bolt and nut, being uninjured by the nut lock, may be repeatedly used.

This nut lock also contemplates a device that, while it prevents loosening of the nut on the bolt, does not set the elements in fixed positions but permits the nuts to be tightened on the bolt whenever necessary or desirable.

Among its other objects the present invention contemplates the elimination of any movement of the bolt relative to the rail or to the fish plates either during the manipulation of the nut or subsequently, so that the entire bolt and nut structure will not be responsive to the rail vibration.

With the above and other objects in view, as will be apparent, this invention consists in the construction, combination and arrangement of parts all as hereinafter more fully described, claimed and illustrated in the accompanying drawing, wherein:

Figure 1:
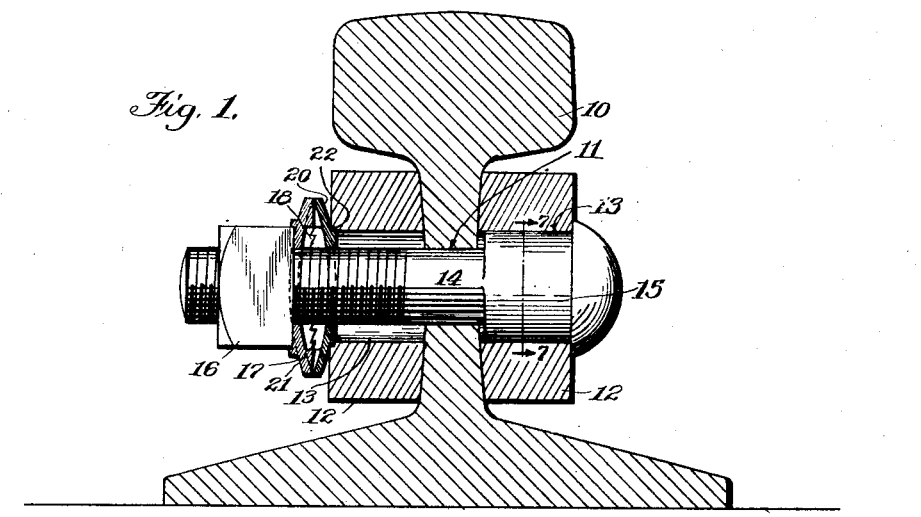
Fig. 1 is a transverse section taken along line 1—1 of Fig. 2 through a rail and cooperating fish plates illustrating the present invention applied thereto.
Figure 3:
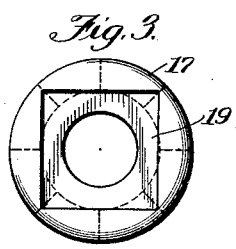
Fig. 3 is a face elevation of the outer locking washer.
Figure 4:
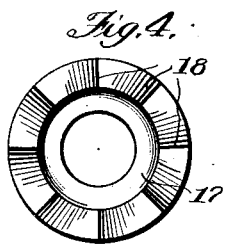
Fig. 4 is a similar view of the inner face of said outer locking washer.
Figure 5:
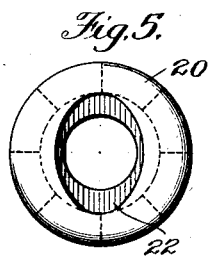
Fig. 5 is an elevation of the outer face of the inner locking washer.
Figure 6:
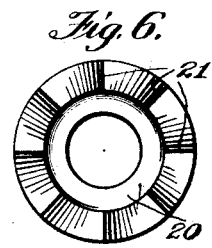
Fig. 6 is a similar view of the inner face of the inner locking washer.
Figure 2:
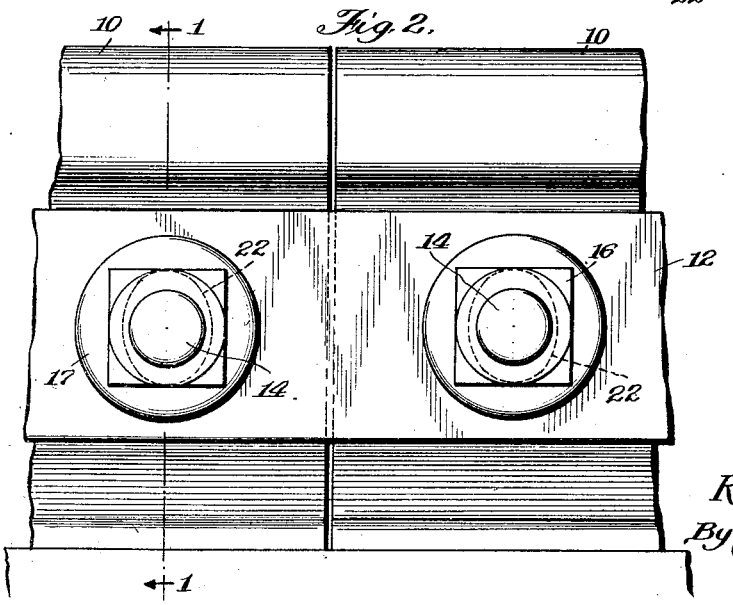
Fig. 2 is a side elevation of a rail joint illustrating the present nut lock cooperating therewith.
Figure 7:
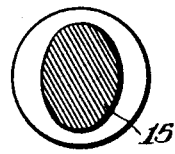
Fig. 7 is a vertical section taken through the stem of the bolt adjoining the head thereof as is indicated by line 7—7 of Fig. 1.

Reference being had more particularly to the drawing 10 indicates a standard rail with the usual circular bolt hole 11 in the web thereof. On each side of the abutting ends of a pair of rails 10 are the fish plates 12 which in lieu of the usual circular bolt holes are pierced with the elliptical openings 13 for the passage of the bolts there through.

The bolt 14 used in attaching the fish plates 12 to the web of abutting rails 10, is of the usual and standard construction except that it is provided with the elliptical collar 15, adjoining the head thereof. This collar 15, is formed integrally with the bolt 14, and is of a shape and size to snugly fit into the elliptical apertures or openings 13, in the fish plates.

By this construction, the bolt when inserted in the fish plates 12 and bolt hole 11 of the rail 10 is prevented from having a rotary movement relative thereto by the elliptical collar or shoulder 15, engaging in the similarly formed opening in the fish plates. This prevents vibration from causing the bolt to tend to shift its position and serves the additional purpose of holding the bolt stationary while the nut 16, is being threaded thereon.

The nut 16, is of a usual standard construction, provided with any suitable number of faces for the engagement thereof by a wrench.

The nut locking structure consists of two interlocking spring washers interposed between the nut 16, and the adjoining fish plate 12. The outer locking washer 17, has a concave inner surface and presents a convex outer surface to the nut 16. The washer 17 is flattened at its inner peripheral portion which is provided with ratchet teeth 18. The outer surface of washer 17 has a depression 19 shaped to conform to and receive the nut 16, so that when the nut is seated in the depression 19, the rotation of the nut would cause the washer 17 to rotate with it.

The inner locking washer 20, like the washer 17, has a concave inner surface and presents a convex outer surface to the adjoining fish plate 12. The inner surface of the washer 20, is flattened at its peripheral portion and the face of such flattened portion is provided with the ratchet teeth 21, designed to cooperate with the teeth 18 of the outer washer 17. The outer face of the inner washer 20 coacts with the adjoining fish plate 12 to prevent any movement of this inner washer 20 relative to the adjoining fish plate 12 and the bolt 14, and for this purpose the outer surface of said washer is provided with a projecting elliptical shoulder 22, which is received in and snugly fits the elliptical opening 13, in the fish plate.

In practice the fish plates 12 are assembled at the rail joint and rest flush against the webs of the rails 10. The bolt 14, is then inserted through the apertures 13, in the fish plates and the bolt hole 11 in the web of the rail. This causes the collar 15 of the bolt to be received in and engaged by the elliptical aperture 13, of one of the fish plates 12.

The protruding threaded end of the bolt 14, then has the washers 17 and 20 placed thereon with the concave surfaces thereof facing each other and the convex surface of the inner washer 20, adjoining the fish plate 12, while the convex surface of the outer washer 17 is presented toward the nut 16.

The nut 16, is then threaded upon the bolt 14, until the inner washer 20 all but touches the outer surface of the adjoining fish plate 12. The washers are then manipulated until the ellipitical shoulder 22 of the inner washer 20 is seated in the opening 13 of the adjoining fish plate, and the nut 16 is seated in the depression 19 of the outer washer 17. When the parts of the device are so situated the further threading of the nuts 16 upon the bolt 14 causes the outer washer 17 to move with the nut 16, while the inner washer 20 is held stationary by the fish plate 12 coacting with the projection or shoulder 22 of said inner washer.

The continued rotation of the nut causes the ratchet teeth 18, of the outer washer 17 to ride over the teeth 21 of the inner washer 20, and compresses said washers until the desired tension is obtained.

When this occurs the outer washer 17 cannot move relatively to the nut 16 and the inner washer 20 cannot move relatively to the fish plate 12. The interconnected or interlocked teeth 18 and 21, of these washers prevent any movement between said washers that would loosen the nut 16, on the bolt.

In other words while the nut 16 can be tightened on the bolt 14, it cannot be loosened so long as the nut is engaged in the depression 19 of the outer washer and the projection or shoulder 22 of the inner washer is seated in the opening 13 of the adjoing fish plate 12.

It is to be observed that the locking of the bolt 14 in its apertures and the fixing of the nut 16 thereon by the use of the present invention does not require or involve any mutilation whatever of the nut, the bolt or the locking washers.

If it is desired to remove the nut 16 from the bolt 14 a tool may be inserted under the convex surface of the inner washer 20, and by applying an outward pressure thereto the washers 17 and 20 may be compressed until the shoulder 22 has been removed from the opening 13 of the fish plate. A retrograde movement may then be given to the nut 16 and the washers 17, 20 and nut removed from the bolt 14.

This engagement of the nut 16 and bolt by the washers 17 and 20, does not in any way mutilate or injure the nut or washers or the threads on the bolt so that all of these elements may be repeatedly used.

From the foregoing it is manifest that in addition to not mutilating the bolt or nut either in locking the elements or in disengaging them, the present invention provides a simple and durable nut lock which will permit the nut to be tightened after the lock has been initially set and at the same time will prevent the nut from becoming loosened or disengaged from the bolt.

It is obvious that while the nut lock herein described is designed particularly for use in connection with rail joints, it may with very slight modification be effectively used wherever bolts and nuts generally can be used.

Having thus described my invention, what I claim as new and desire to secure by Letters Patent is:—

1. A nut lock consisting of a pair of concavo-convex spring washers, having ratchet teeth on their concave surfaces, one of said washers being provided with a depression for the seating of a nut therein, and the other of said washers having a projection thereon adapted to be engaged to hold said washer from rotary movement.

2. A nut lock consisting of a pair of concavo-convex spring washers, having ratchet teeth on their concave surfaces, one of said washers being provided with a depression in the convex surface thereof for the reception of a nut therein, and the other of said washers having a projection on its convex surface adapted to be engaged to hold said washer from rotary movement.

3. The combination with a plate having an eccentric opening therein, of a bolt adapted to pass through said opening, and a pair of concavo-convex spring washers mounted on said bolt, having interengaging ratchet teeth on their adjoining concave faces, one of said washers being provided with an eccentric projection to be received in said opening, and the other of said washers having a depression in its outer face for the reception and engagement of a nut.

4. A nut lock comprising a pair of dished washers having their concave surfaces facing each other and provided on their inner faces with ratchet teeth for preventing relative turning in a negative direction, one washer having shoulders adapted to engage the nut to hold the latter against negative rotation and the other washer having a shoulder whereby it may be held against rotation in any direction, said washers being resilient whereby one of them may be sprung out of engagement with the part with which it is engaged on the convex side whereby the nut may be freed for negative rotation.

In witness whereof, I have hereunto subscribed my name.

ROY E. CLEGG.